(12) United States Patent
Ortacdag et al.

(10) Patent No.: US 9,356,861 B2
(45) Date of Patent: May 31, 2016

(54) SECONDARY LOOKUP FOR SCALING DATAPATH ARCHITECTURE BEYOND INTEGRATED HARDWARE CAPACITY

(71) Applicant: Alcatel-Lucent, Paris (FR)

(72) Inventors: Erel Ortacdag, Ottawa (CA); Alp Dibirdi, Andover, MA (US)

(73) Assignee: Alcatel Lucent, Boulogne-Billancourt (FR)

( * ) Notice: Subject to any disclaimer, the term of this patent is extended or adjusted under 35 U.S.C. 154(b) by 99 days.

(21) Appl. No.: 14/215,171

(22) Filed: Mar. 17, 2014

(65) Prior Publication Data

US 2015/0263947 A1    Sep. 17, 2015

(51) Int. Cl.
*H04L 12/54* (2013.01)
*H04L 12/741* (2013.01)

(52) U.S. Cl.
CPC .............. *H04L 45/74* (2013.01); *H04L 45/745* (2013.01)

(58) Field of Classification Search
None
See application file for complete search history.

(56) References Cited

U.S. PATENT DOCUMENTS

2012/0307640 A1*  12/2012  Wackerly et al. ............. 370/241
2014/0036918 A1*  2/2014   Varvello et al. ............... 370/392

* cited by examiner

*Primary Examiner* — Kouroush Mohebbi
(74) *Attorney, Agent, or Firm* — Kramer & Amado, P.C.

(57) ABSTRACT

Various exemplary embodiments relate to a method for routing an incoming packet to a destination, the method including: receiving, at a network device, the incoming packet; determining a destination address of the packet; determining that the destination address is not included in a routing table on the network device; sending a message to a companion device, wherein the message includes the destination address; receiving from the companion device, at the network device, a routing indicator for the destination address; and sending the packet towards a destination consistent with the routing indicator.

20 Claims, 3 Drawing Sheets

SECONDARY LOOKUP FOR SCALING DATAPATH ARCHITECTURE BEYOND INTEGRATED HARDWARE CAPACITY

TECHNICAL FIELD

Various exemplary embodiments disclosed herein relate generally to expanding datapath architecture beyond the capacity of integrated hardware.

BACKGROUND

Routing devices (i.e. Routers) are principally responsible for forwarding data, typically in the form of packets, between computer networks, enabling the interconnectivity of the disparate networks that form the Internet. Each device in a network is uniquely identified by one or more addresses indicating its location in the network.

Routers connect data links from different networks. A router reads address information in an incoming packet to determine its destination, and performs a next (network) "hop" information lookup to the destination using its routing table. In this way, packets may be forwarded from one router to another through the networks that constitute the Internet until it reaches its destination node. Additionally, in order to conserve address space in addressing or labeling schemes such as IPv4, IPv6, MPLS, and MAC, routers map multiple addresses into fewer or even one address, and readdress the outgoing packets so they appear to originate from the routers (MAC address summarization is not typical given the number of Organizationally Unique Identifier (OUI) codes involved in MAC addressing but is not impossible).

On routing and switching equipment deployed by network operators and other operators in need of high-bandwidth routing and switching capability, most routing tables reside on integrated hardware such as Application Specific Integrated Circuits (ASICs) or Field Programmable Gate Arrays (FGPAs) with or without external Content Addressable Memory, where the space available for a routing table on any individual router is fixed at a limited size. Because each network and network element such as servers, PCs, smartphones, tablets, and other network-capable devices must be uniquely identified by its own address, the number of network hops and network elements that can be stored in the routing table for any one router is restricted by the size of the space available on the integrated hardware device.

In view of the foregoing, it would be desirable to provide infrastructure to allow extension of the existing routing and switching architecture without hardware upgrades or service disruptions.

SUMMARY

In light of the present need for infrastructure to allow extension of the existing routing and switching architecture without hardware upgrades or service disruptions, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for routing an incoming packet to a destination, including receiving, at the network device, the incoming packet; determining a destination address of the packet; determining that the destination address is not included in a routing table on the network device; sending a message to a companion device, wherein the message comprises the destination address; receiving from the companion device, at the network device, a routing indicator for the destination address; and sending the packet towards a destination consistent with the routing indicator.

In alternate embodiments of the method, the message is an error message indicating that the destination address is unavailable. Further alternate embodiments of the method include adding the destination address and the routing indicator to the routing table. Additional alternate embodiments of the method include updating a destination address access indicator on the routing table. In some alternate embodiments of the method, the destination address access indicator includes a hit bit. In further alternate embodiments of the method, the destination address access indicator comprises a time stamp.

Another alternate embodiment of the method includes adding to the routing table related routing indicators for one or more destination addresses related to the destination address. Further alternate embodiments of the method include updating one or more related destination address access indicators on the routing table, wherein the one or more related destination address access indicators correspond to the one or more related destination addresses. Additional alternate embodiments of the method include sending the routing table to the companion device; and receiving an updated routing table from the companion device. In some alternate embodiments of the method, the updated routing table is identical to the routing table.

Another alternate embodiment of the method includes receiving, at the network device, an update message from the companion device, the update message comprising the destination address and the routing indicator; determining that the routing table has space available; and adding the destination address and the routing indicator to the routing table. In some alternate embodiments of the method, the packet is an Internet Protocol packet.

Various exemplary embodiments relate to a method performed by a companion device for routing an incoming packet to a destination, including receiving, at the companion device, a message comprising a destination address; determining if the destination address is included in a routing table on the companion device; and sending a routing message to a network device, wherein the routing message comprises the destination address and a routing indicator. In some alternate embodiments of the method, the message is an error message indicating that the destination address is unavailable. In some alternate embodiments of the method, when the destination address is not included in a routing table on the companion device, the routing indicator comprises an indication that the destination address is unavailable. In further embodiments, the method includes receiving, at the companion device, a routing table from the network device; adding the destination address and the routing indicator to the routing table from the network device; and sending to the network device the routing table from the network device, including the destination address and the routing indicator.

Some alternate embodiments of the method include receiving, at the companion device, a routing table from the network device; adding to the routing table from the network device one or more destination addresses related to the destination address and their associated routing indicators; and sending to the network device the routing table from the network device, including the one or more destination addresses related to the destination address and their associated routing indicators. Additional alternate embodiments of the method include receiving, at the companion device, routing tables from one or more network devices associated with the companion device; adding to each of the one or more routing tables the destination address and the routing indicator; and sending to each of the one or more network devices their routing table, including the destination address and the routing indicator.

Further alternate embodiments of the method include receiving, at the companion device, a routing table from the network device; determining that at least one access indicator corresponding to at least one destination address in the routing table from the network device does not indicate that the destination address in the routing table from the network device has been accessed; deleting the destination address corresponding to the access indicator; and sending to the network device the routing table from the network device, excluding the deleted destination addresses. Alternate embodiments of the method include, after determining whether an access indicator corresponding to at least one destination address in the routing table from the network device indicates that the destination address in the routing table from the network device has been accessed, changing the access indicator to indicate that the destination address in the routing table from the network device has not been accessed.

It should be apparent that, in this manner, various exemplary embodiments enable extension of the existing routing and switching architecture without hardware upgrades or service disruptions

BRIEF DESCRIPTION OF THE DRAWINGS

In order to better understand various exemplary embodiments, reference is made to the accompanying drawings, wherein.

DETAILED DESCRIPTION

Figure 1:
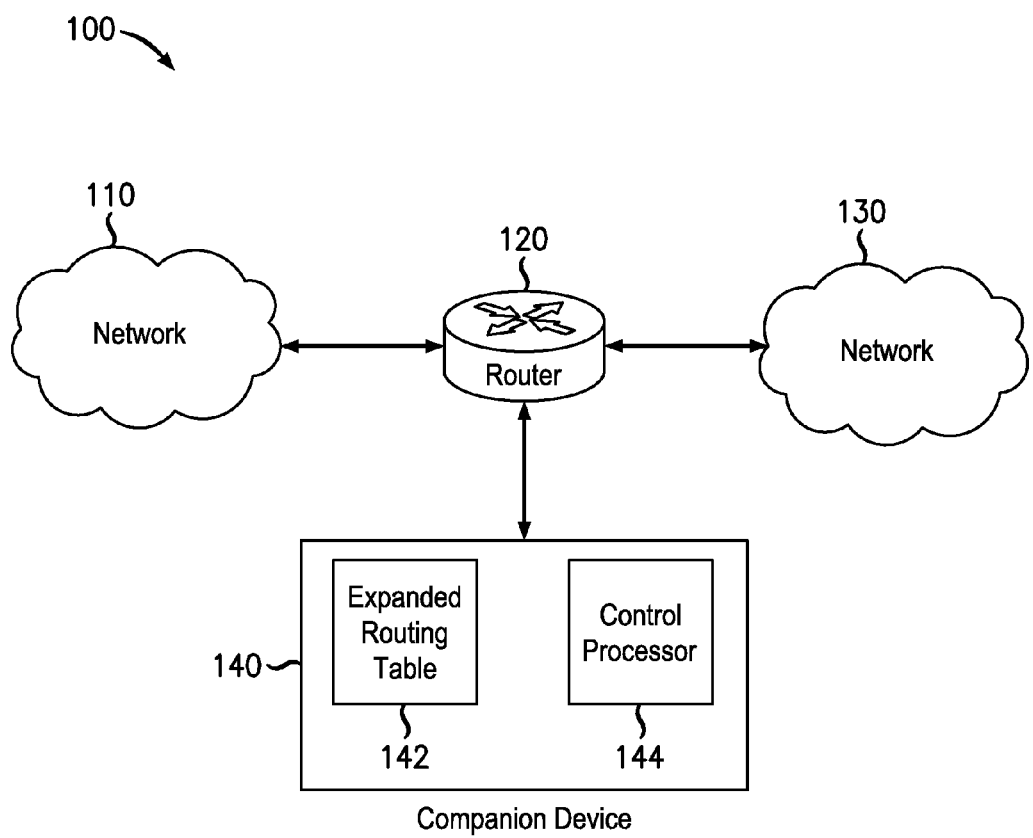
FIG. 1 illustrates an exemplary embodiment of components arranged to provide extended routing tables to routers.

In light of the present need for infrastructure to allow extension of the existing routing and switching architecture without hardware upgrades or service disruptions, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

The number of devices connected to Internet is rapidly growing in previously unanticipated ways. In addition to new communications devices such as smart phones and tablets, the advent of the "Internet of Everything," means that devices formerly not connected to networks, for example, automobiles, appliances, thermostats, and smoke detectors, are now being connected to enable online and on-time data exchange. In concert with the rapid growth of not only devices, but classes of devices connected to the Internet, the number of addresses that will need to be provisioned and stored in network devices such as routers or switches is expected to grow exponentially. The lookup capacity of the equipment already deployed by network operators shall soon be exceeded. Thus, as the number of network-enabled devices increases at a rapid pace, the infrastructure that is required to host these ever growing number of devices needs to support a rapidly increasing number of addresses, for example, IPv4, IPv6 routes, Multiprotocol Label Switching (MPLS) labels and media access control (MAC) addresses.

Network Operators and other high-bandwidth providers typically consolidate routing functions into multiple line cards residing in a single chassis, each card with its own routing tables and other routing functionality. Although each line card may be thought of as a router, these systems themselves may be referred to as routers, or other similar term such as edge routers or core routers. Because the hardware for storing routing tables is integrated into the line cards (routers), increasing the size of these tables would require hardware upgrades of the entire router chassis in a process that would be costly and time consuming for network operators and that may cause service disruption to end users.

In some cases, existing deployed equipment has much larger general memory, or general use shared memory available which may be re-factored for extra storage. However, conventional forwarding processes are not configured to access routing tables stored in general use memory in order to look up destinations. With the solution described herein, a forwarding agent (e.g. a router, Ethernet (i.e. as defined in various different IEEE 802.3 standards) or MPLS switch, etc.) can be seamlessly scaled—by consulting the exiting shared/general use memory to perform lookups, the forwarding device would no longer be limited by the lookup memory associated with the forwarding hardware but can perform a secondary (or even a tertiary) lookup to external shared and typically much more scalable memory spaces.

Which memory spaces may be used or re-factored for route lookup purposes depends on the architecture and availability of free space on different hardware implementations. However, generally speaking, physical bus bandwidth is minimal given the efficiency that is gained: once a remote (non-native to the forwarding device) memory space is consulted for a table entry or entries and a match is found, the entry or entries are written to the primary memory associated with the forwarding device such that any subsequent lookups would remain local. Local lookups ensure fast processing and forwarding. Non-native memory may only be consulted for the first packet or frame to a given destination that is not already stored in local memory. For all subsequent packets or frames, next hop information is copied to local memory and used until a specific timeout or a management action that results in deletion of this local next hop information.

Various exemplary embodiments relate to a mechanism to extend address tables by providing a routing address lookup assist while still using the same integrated hardware resources. Although the term 'routing address' and 'routing table' generally refer to IP addressing, a person of skill in the art will understand that the procedures described herein will also apply to MPLS and MAC database lookups.

Referring now to the drawings, in which like numerals refer to like components or steps, there are disclosed broad aspects of various exemplary embodiments.

Various components for providing extended routing tables to routers are shown in FIG. 1. As described above, a router 120 forwards packets between two networks 110, 130. As may be apparent to one of ordinary skill in the art, a single router device or collection of devices 120 may be capable of routing packets for various addressing or labeling schemes such as IPv4, IPv6, MPLS, and MAC using a forwarding information base (FIB) such as a routing table and a forwarding engine configured to determine the correct labeling scheme for each received packet. Using a companion lookup capable device 140 such as, for example, a FPGA, Network Processor (NP) or a general use Central Processing Unit (CPU), a larger routing table 142 than can be maintained using existing hardware integrated in router 120 are hosted for multiple routers in a centralized manner. Companion device 140 may be integrated on a control card or other shared resource in a chassis which may be accessed and used by a line card implementation as described below or may be another device on the same line card that has adequate memory available for partial or complete re-factoring for lookup purposes. For example, if a routing table (sometimes referred to as a Forwarding Information Base (FIB)) stored in integrated hardware in router 120 such an ASIC or FPGA doesn't contain addressing information matching information contained in an incoming packet, some conventional routing implementations might fail to forward the packet from a first network 110 to a second network 130 (sometimes referred to as "dropping the traffic"). Often this is handled by an error handler in the router 120, which will send information back to the originating device in network 110 or network 130 that the destination address is not available. In the router 120, instead of dropping the traffic, a secondary lookup of the address information may be performed by the companion device 140 which may be capable of hosting much larger tables 142 than the memory associated with the forwarding chip on the individual line card 120.

A companion device 140 in conjunction with a forwarding engine on line card 120 may also dynamically install and delete routes from routing tables hosted on the integrated hardware of the router 120 as part of the secondary lookup process. For example, when a route is used it may be added to the table, and if it is no longer needed it may be deleted from the table, saving space and making future lookups more efficient. In this way, a control processor 144 on a companion device 140 may assume routing table maintenance tasks. As will be understood by a person skilled in the art, to aid in determining whether a route is still needed the routing table in router 120 may include a bit, counter, time stamp, or other indicator that a route listed on the table has been used to forward a packet. Likewise, the routing table 142 on companion device 140 may include an indicator that a route listed on the companion device's expanded routing table 142 has been sent to one or more routers 120. Such usage counters may reside on integrated hardware 120. It should be apparent to one of skill in the art that although it may take longer to route an incoming packet by performing a lookup on a secondary lookup table, the additional overhead will typically be limited to the first packet or frame to a given destination; although a few additional packets might be handled via a lookup at companion device 140 until the route information is installed to route processor 120. Once the new forwarding entry is copied to integrated hardware 120, all subsequent packets or frames to the same destination will not be subject to the additional delay incurred from consultation of the companion device 140. Therefore, as a result of the secondary lookup process, the routing table on the router 120 is updated to include the destination address, and time will be saved by routing all subsequent packets using the table local to router 120.

It should be noted that while router 120 is shown in arrangement 100 to be a single device, router 120 may represent multiple line cards residing in a single chassis, multiple devices, or other arrangement for forwarding data between networks. In configurations where router 120 represents multiple components such as line cards or devices, method steps applied to router 120 may be applied to a single component of router 120, or to multiple components. For example, a control processor 144 may update all line cards in router 120 with routing information for a destination address requested by only one line card, or may update only the line card that requested routing information for the destination address. Likewise, companion device 140 may be resident on a single device, or may be distributed among several interconnected devices. Companion device 140 may be resident in the same chassis as line cards installed in router 120, may be a separate device operatively connected to router 120, or may be connected to router 120 across a network.

In one exemplary embodiment, integrated hardware in router 120 may support only 8,000 routes, but a companion device NP 140 may have the resources to store 128,000 route lookups in the expanded routing table 142, extending the lookup capability of the router 120 to virtually 128K, far beyond its integrated hardware capacity of 8K.

Figure 2:
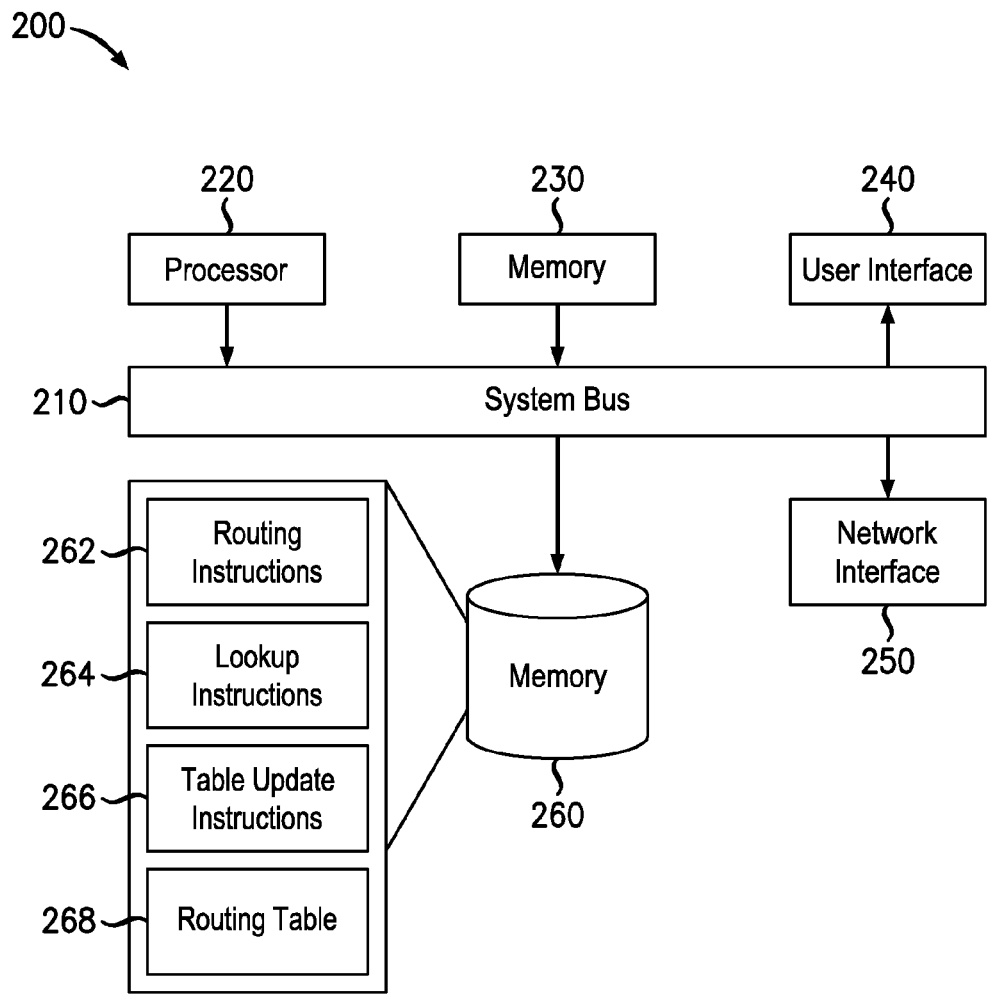
FIG. 2 illustrates an exemplary hardware diagram for implementing a router or companion device.

FIG. 2 illustrates an exemplary hardware diagram 200 for implementing a router or companion device. Exemplary hardware 200 or similar hardware with little modification may correspond to router 120 or companion device 140 of exemplary arrangement 100. For example, exemplary hardware 200 may implement a CPU, one or more NPs, or a router. As shown, the hardware 200 includes a processor 220, memory 230, user interface 240, network interface 250, and storage 260 interconnected via one or more system buses 210. It will be understood that FIG. 2 constitutes, in some respects, an abstraction and that the actual organization of the components of the hardware 200 may be more complex than illustrated.

The processor 220 may be any hardware device capable of executing instructions stored in memory 230 or storage 260. As such, the processor may include a microprocessor, field programmable gate array (FPGA), application-specific integrated circuit (ASIC), or other similar devices.

Memory 230 may include various memories such as, for example L1, L2, or L3 cache or system memory. As such, memory 230 may include static random access memory (SRAM), dynamic RAM (DRAM), flash memory, read only memory (ROM), or other similar memory devices.

The user interface 240 may include one or more devices for enabling communication with a user such as an administrator. For example, the user interface 240 may include a display, a mouse, and a keyboard for receiving user commands.

The network interface 250 may include one or more devices for enabling communication with other hardware devices. For example, the network interface 250 may include a network interface card (NIC) configured to communicate according to the Ethernet protocol; Packet over Sonet (POS) protocol over various hierarchies including OC3/STM1, OC12/STM4, etc.; Point-to-Point (PPP) over various hierarchies including DS3/E3, T1/E1, etc.; and other protocols. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon which the processor 220 may operate. For example, where the hardware 200 implements a router 120, the storage 260 may store routing instructions 262 for coordinating router functionality such as receiving packets, determining a next hop, and forwarding packets. The storage 260 also includes lookup instructions 264 for handling cases where a local routing table does not contain a route, as is explained further below. Lookup instructions 264 may differ whether device 200 is a router 120 or a companion device 140. The storage 260 also contains table update instructions 266 for updating routing tables 268 as routes are accessed. The storage 260 also stores routing tables 268 including next hop information and an indicator of whether the route has been used.

It will be apparent that various information described as stored in the storage 260 may be additionally or alternatively stored in the memory 230. For example, the routing table 268 may be additionally, alternatively, or partially stored in the memory 230. In this respect, the memory 230 may also be considered to constitute a "storage device." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the hardware 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. In some embodiments, such as those wherein the hardware is implemented in a cloud computing architecture, components may be physically distributed among different devices. For example, the processor 220 may include a first microprocessor in a first data center and a second microprocessor in a second data center. Various other arrangements will be apparent.

Figure 3:
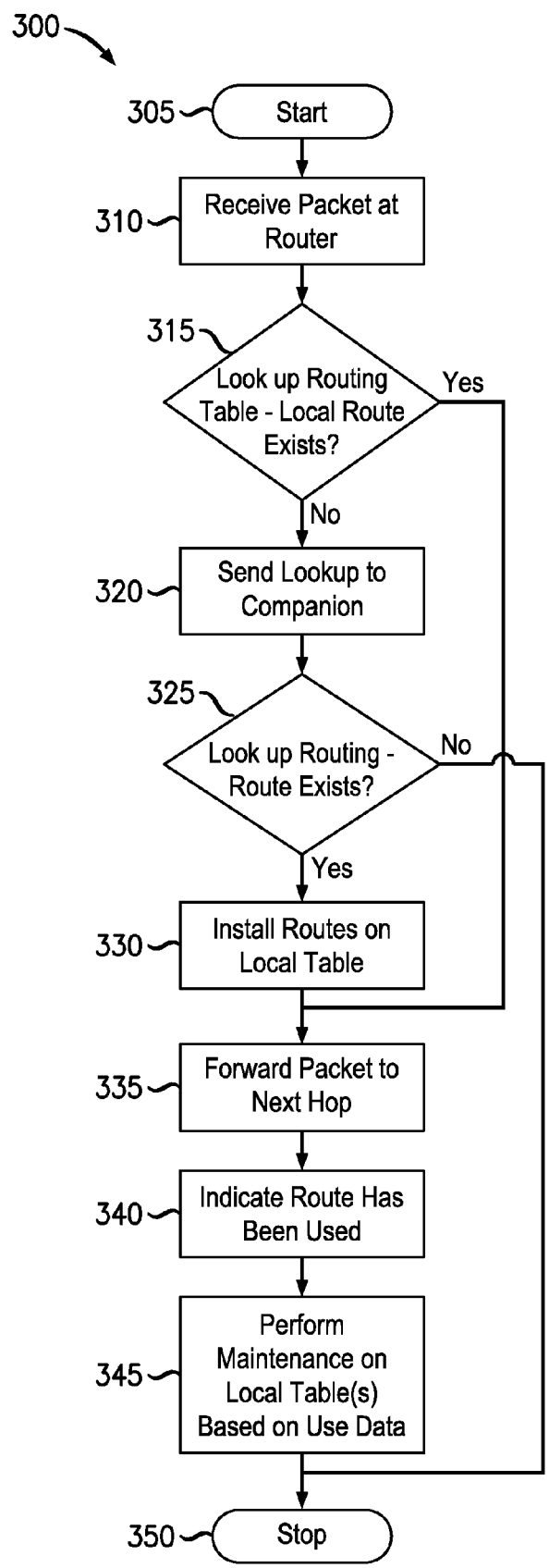
FIG. 3 illustrates an exemplary method performed by a router and companion device for processing an incoming packet to determine a next hop.

FIG. 3 illustrates an exemplary method 300 performed by a router and companion device for processing an incoming packet to determine a next hop. The method 300 may be performed by a router and companion device such as the router 120 and companion device 140 of exemplary arrangement 100.

The method begins in step 305 and proceeds to step 310 where the router receives a packet for forwarding. For example, the router may receive an IP packet. Step 310 may include various elements such as validating information contained in the packet, for example, validating a MAC address. Next, in step 315, the router looks up the destination address in the packet in the local routing table to determine the next hop. In one exemplary embodiment, an IP routing lookup is performed for the destination IP address inside the IP header (as described in Internet Protocol RFC791) of an incoming IP packet in order to find where the packet needs to be forwarded. If the destination address is contained in the router's 120 lookup table, the method skips ahead to step 335. Otherwise, in step 320 the router sends the look up information to the companion device 140. In one embodiment, if the destination address is not in the router's lookup table, at step 320 the router's 120 error handler forwards the lookup request to the companion device 140, which may be an NP or FGPA with a higher density route search capability.

In step 325, the companion device 140 looks up the destination address in the routing lookup table 142. If the destination address is not contained in the companion device's lookup table 142, and there is no default action specified, then the packet is dropped and the method proceeds to step 350. In some embodiments, default actions from step 325 if the destination address is not contained in the companion device's lookup table may include a secondary or tertiary lookup 320 in an alternate companion device (not shown). Otherwise, if a route is found in routing table 142, in step 330 the control processor 144 installs the destination address into the routing table on router 120 so that if another packet with the same destination address is received by the router 120, the router 120 may do the route lookup using its own local routing table. In some embodiments, if there is no free space in router's local routing table when the control processor 144 attempts to insert a route into the routing table, then the route is not added to the router's routing table and each incoming packet with a matching route must be looked up through the companion device 140 until unused routes are deleted from the router's table, freeing up space so that new routes may be installed. In some embodiments, if the packet is an IP packet, in step 330 control processor 144 may also install the related longest prefix match routes into the routing table on the router 120.

In step 335, router 120 forwards the packet to the next hop. In step 340, the routing table may be updated to reflect that router 120 searched the destination address. In some embodiments, in step 340 the router 120 may update routing table 142. In some embodiments, in step 340 the control processor 144 may update routing table 142. In some embodiments, in step 340 the control processor 144 may also update routing table 142 to reflect that router 120 searched a destination address and all related longest prefix match routes.

In step 345, the control processor loops through routes installed in the routing table of the router 120, and will delete routes that do not have a current indicator indicating that a route has been used. For example, the control processor may compare a hit bit or statistics (whichever is provided) on the router's 120 local routing table with a recorded time duration or timestamp and delete any route that has not been used for a default or configurable time. If a hit bit is provided in the router's routing table, the hit bit will be cleared by the control processor when the destination address is read during the update loop. If a hit bit but no time stamp is provided, the control processor 144 may delete all destination addresses whose corresponding hit bits indicate they have not been accessed since the last loop. Deleting unused routes from the routing table on router 120 will make available unused space on the router's routing table. In some embodiments, in step 345 one or more routes may be deleted if another entry in the forwarding information base can be used. If such an entry doesn't exist, then lookup of the companion device is triggered 320 upon reception of the next packet where routing information is not readily available on the local hardware. 220. When installing routing entries from the companion device 140, when a route with larger coverage or a subnet is installed, more specific routes for the same destination may be installed to the route device simultaneously to ensure efficiency in the longest prefix match lookup procedure. Routers use the longest prefix lookup procedure to find the best nexthop for a given destination. Similar caution needs to be applied while deleting a route from route processor database. Deletion starts with the least specific subnet route. Upon deletion of less specific subnet entry or entries, the timer for the next entry with more specific coverage/subnet needs to be restarted. The use of timers avoids a loop situation where the same entries are continuously deleted and updated from the companion device 320. In some embodiments, if the router 120 does not support a hit bit or statistics for a route that is actively used, a timer may be used to determine if the route should be deleted from the router's routing table. The method 300 then proceeds to end in step 350.

It will be apparent that various embodiments may perform the steps of the method 300 in different orders and potentially in parallel. For example, an alternative method may perform step 345 prior to step 315. As another example, steps 340, 345 may be performed in parallel with steps 330, 335. Various embodiments may apply the steps of the method 300 to packets using one or more addressing schemes, for example, IPv4, IPv6, MPLS, and MAC. Various other modifications will be apparent.

According to the foregoing, various exemplary embodiments enable extending router lookup tables while using limited integrated hardware resources. For example, by forwarding to a companion device those destination address lookup requests that are not satisfied by a local lookup table, packets with destination addresses on the companion device's routing table will not be discarded. Further, additional mechanisms are implemented to update the router's tables so that current information is efficiently maintained. By extending the size of a router lookup table without requiring a hardware update, replacement of an existing router for a new router having a larger lookup table may be delayed or avoided. Various additional benefits will be apparent in view of the foregoing.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for routing an incoming packet to a destination, the method comprising:
   receiving, at the network device, the incoming packet;
   determining a destination address of the packet;
   determining that the destination address is not included in a routing table on the network device;
   sending a message to a companion device which is on a shared memory on a chassis containing the network device, the shared memory having different functionality than the network device, wherein the message comprises the destination address;
   receiving from the companion device, at the network device, a routing indicator for the destination address, wherein the routing indicator is used in managing extension of the routing table; and
   sending the packet towards a destination consistent with the routing indicator.

2. The method of claim 1, wherein the message is an error message indicating that the destination address is unavailable.

3. The method of claim 1, further comprising:
   adding the destination address and the routing indicator to the routing table.

4. The method of claim 3, further comprising:
   updating a destination address access indicator on the routing table.

5. The method of claim 4, wherein the destination address access indicator comprises a hit bit.

6. The method of claim 4, wherein the destination address access indicator comprises a time stamp.

7. The method of claim 1, further comprising:
   adding to the routing table related routing indicators for one or more destination addresses related to the destination address.

8. The method of claim 7, further comprising:
   updating one or more related destination address access indicators on the routing table, wherein the one or more related destination address access indicators correspond to the one or more related destination addresses.

9. The method of claim 1, further comprising:
   sending the routing table to the companion device; and
   receiving an updated routing table from the companion device.

10. The method of claim 9, wherein the updated routing table is identical to the routing table.

11. The method of claim 1, further comprising:
    receiving, at the network device, an update message from the companion device, the update message comprising the destination address and the routing indicator;
    determining that the routing table has space available; and
    adding the destination address and the routing indicator to the routing table.

12. The method of claim 1, wherein the packet is an Internet Protocol packet.

13. A method performed by a companion device for routing an incoming packet to a destination, the method comprising:
    receiving, at the companion device, a message comprising a destination address;
    determining if the destination address is included in a routing table on the companion device; and
    sending a routing message to a network device, wherein the routing message comprises the destination address and a routing indicator, wherein the routing indicator is used in managing extension of the routing table, wherein the companion device is on a shared memory on a chassis containing the network device, the shared memory having different functionality than the network device.

14. The method of claim 13, wherein the message is an error message indicating that the destination address is unavailable.

15. The method of claim 13, wherein, when the destination address is not included in a routing table on the companion device, the routing indicator comprises an indication that the destination address is unavailable.

16. The method of claim 13, further comprising:
receiving, at the companion device, a routing table from the network device;
adding the destination address and the routing indicator to the routing table from the network device; and
sending to the network device the routing table from the network companion device, including the destination address and the routing indicator.

17. The method of claim 13, further comprising:
receiving, at the companion device, a routing table from the network device;
adding to the routing table from the network device one or more destination addresses related to the destination address and their associated routing indicators; and
sending to the network device the routing table from the network companion device, including the one or more destination addresses related to the destination address and their associated routing indicators.

18. The method of claim 13, further comprising:
receiving, at the companion device, routing tables from one or more network devices associated with the companion device;
adding to each of the one or more routing tables the destination address and the routing indicator; and
sending to each of the one or more network devices their routing table, including the destination address and the routing indicator.

19. The method of claim 13, further comprising:
receiving, at the companion device, a routing table from the network device;
determining that at least one access indicator corresponding to at least one destination address in the routing table from the network device does not indicate that the destination address in the routing table from the network device has been accessed;
deleting the destination address corresponding to the access indicator; and
sending to the network device the routing table from the network companion device, excluding the deleted destination addresses.

20. The method of claim 19, further comprising:
after determining whether an access indicator corresponding to at least one destination address in the routing table from the network device indicates that the destination address in the routing table from the network device has been accessed, changing the access indicator to indicate that the destination address in the routing table from the network device has not been accessed.

* * * * *